United States Patent

[11] 3,598,235

[72] Inventor Laszlo Demeter
    Budapest, Hungary
[21] Appl. No. 831,854
[22] Filed June 10, 1969
[45] Patented Aug. 10, 1971
[73] Assignee Nikex Nehexipari Kulkereskedelmi Vallalat
    Budapest, Hungary

[54] PROCESS AND EQUIPMENT FOR THE PURIFICATION OF LIQUIDS BY FILTRATION
    2 Claims, 1 Drawing Fig.
[52] U.S. Cl. .................................................. 210/80,
    210/82, 210/189, 210/197, 210/268, 210/275
[51] Int. Cl. ............................................... B01d23/10,
    B01d 29/38
[50] Field of Search ........................................ 210/189,
    268, 80, 82, 197, 275

[56] References Cited
UNITED STATES PATENTS
| | | | |
|---|---|---|---|
| 1,130,382 | 3/1915 | Deacon et al. | 210/189 |
| 2,287,983 | 6/1942 | Gavett | 210/268 X |
| 3,296,775 | 1/1967 | Squires | 210/268 X |

Primary Examiner—Samih N. Zaharna
Attorney—Young and Thompson

ABSTRACT: Liquid to be filtered enters a distributor and then passes through a wall comprised of downwardly inclined shutters into a vertical filter column for horizontal flow through the filter material and thence through a sieve to the filtrate outlet. To wash the filter, wash liquid is forced into the column from below with the outlet closed, so that the column backwashes through the shutters to the distributor, below which the washed-out material collects. An air lift raises this collected material to the top of the filter column, from which the material other than the filter medium is decanted.

PATENTED AUG 10 1971
3,598,235
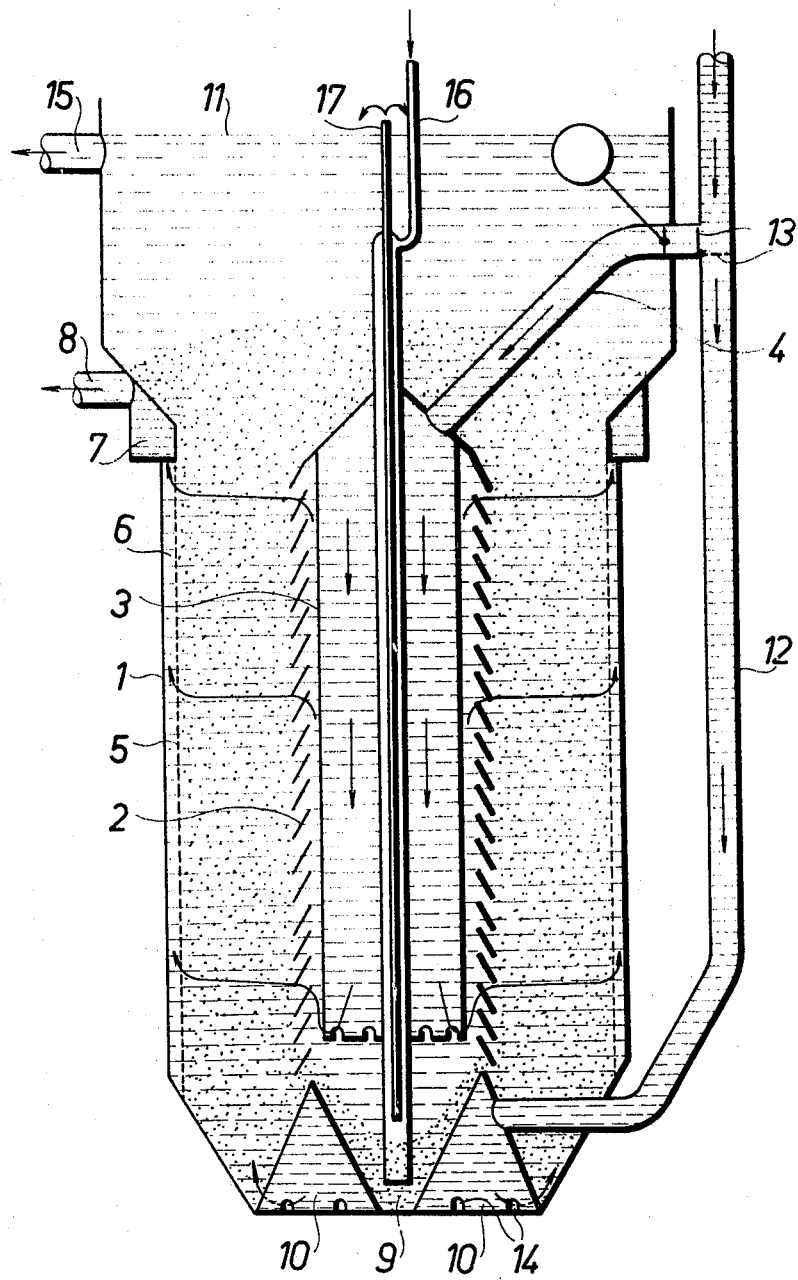
INVENTOR
LÁSZLÓ DEMETER
BY Young & Thompson
ATTORNEYS

PROCESS AND EQUIPMENT FOR THE PURIFICATION OF LIQUIDS BY FILTRATION

The invention relates to a process and an equipment for the purification of liquids by filtration. By means of the process and equipment according to the invention liquids like wine, oil, petrol and mainly water, that is, chemically treated or untreated, sedimented or not sedimented crude liquids can be safely and inexpensively purified, and the granular substance of the equipment can be purified within a few minutes.

The contaminations suspended in surface waters, in particular in river water are generally removed by filtration after being sedimented.

Filtration is performed by means of a filter layer consisting of particles, preferably sand granules. On the primary filter layer a secondary filter layer is formed from artificial floccules or from natural suspended particles, sand secondary filter layer permitting extremely fine filtration, i.e. crystal filtration.

By conventional methods the crude water to be purified is caused to pass through a horizontal layer of 1 to 2 m. thickness, generally flowing vertically downwardly, and the contaminations suspended in the crude water remain between the particles, while the crude water passes through the filter layer.

The main disadvantage of this conventional filtering method consists in that the interstices between the particles are filled up by the suspended contaminations after a relatively short period of time, so that the filter layer soon looses its filtering capacity and needs frequent purification.

A further disadvantage is that large amounts of water are needed for washing the particles, representing an appreciable loss, since the main object of the process is to produce pure water. Nevertheless, pure water must be used for washing the filter layer, since the washing water is fed under the filter layer through water distributor apertures of only a few tenths of mm. width and crude water would obviously block these gaps. On the other hand, the gaps must not exceed this slight width, since they are disposed on the top part of the distributor space for the washing water and might let the filtering particles pass, if they were of larger width. The filter particles might then fall into the water distributor space and would block or clog it.

In the conventional filtering equipment a base or support is required, as well as a filtering gravel layer of a width over 1 meter, with the size of the gravels decreasing gradually upwardly. The conventional filtration equipment is therefore voluminous, and requires large buildings and expensive installations, whereas the efficiency is very low.

Another deficiency or drawback of the known equipment resides in the requirement of uniform grain size of the filter layer. This requirement must be strictly observed in conventional sand filters, since a detrimental segregation occurs upon washing when flow is reversed. After the washing the finest grains form the upper layer, and consequently the slurry uptake capacity of the equipment is determined by this layer. Accordingly, the bulk of the sand layer, sometimes amounting to as much as 1 to 2 meters, remains practically unutilized, since filtration is performed by a thin sand layer, which may be as thin as 2 to 3 cm., whereas the rest of the layer merely acts as a nonactive support layer.

Another important drawback of the known static or stationary filter layers consists in the appearance of a lumpy incrustation of a thickness of several cm. during operation at the inlet side of the top filter surface. Such incrustation is promoted by repeated washing, since the fine grains are gradually washed onto the top part of the filter layer, where they tend to clog, this tendency being still further increased by the slurry penetrating into the layer. Attempts have already been made to loosen such incrustation by means of a powerful jet of water, but these attempts proved to be expensive, water-consuming and their results were but temporary.

The above described static filters operating with a horizontal stationary filter layer, have permitted crystal filtration, but the considerable lack of efficiency necessitated the development of a new process, in which the filter layer consisting of granules has been developed as a wholly or almost vertical filter column disposed between adequately designed, liquid-permeable walls, in which the circulating filter column moves downwardly. Hence, the filter layer is constantly ready for filtration The walls serve to support and guide the filter column, and to control the passage of liquid. The liquid to be filtered passes in a substantially horizontal direction through the filter column.

The process above referred to eliminates the deficiencies of the static filters, and provides a "moving filter bed," in which a filter column of about 20 to 30 cm. is sufficient, owing to the constant continuous change of the downwardly moving filter particles. Hence, the size of the purifying apparatus can be reduced by several orders of magnitude, the associated buildings required for housing the equipment are smaller and less expensive. Since the quantity of filter particles is reduced, an air compressor of small output and low pressure is sufficient. Incrustation of the surface is obviated, and the requirement of uniform particle size need not be strictly observed.

However the quality of filtration does not have sufficient fineness in the case of filters with a moving filter bed, since the filter column moving in downward direction is not uniform along its height, but is more and more contaminated in a downward direction. Accordingly, the column is denser and increasingly impermeable in a downward direction, whereas the loose filter bed formed on the top of the column lacks the appropriate filtering power or filtering capacity, owing to the inadequate formation of the secondary filter bed. Crystal filtration, therefore, cannot be performed with the apparatus in question. While it is possible to obviate to a certain extent this deficiency due to nonuniform contamination, by intermittent movement of the filter column instead of continuous movement, yet in that case the economy of the filtration is substantially lessened.

It is the object of the invention to provide a process and an equipment by which all the advantages achieved by moving filter beds can be retained, and combined with the high quality of crystal filtration, usually achieved only in static filters.

The aim to be achieved by means of the invention is the purification and washing of a vertical filter column used in moving-bed filters, in such a manner that the filtering power remains uniform along the whole length of the filter column, and the contaminated particles of the filter column may be repeatedly purified without the need for a continuous or intermittent movement of the filter column in a downward direction.

In order to achieve the desired aim, i.e. to realize the task set, one proceeds in the following manner: the crude liquid is caused to pass through a known vertical or substantially vertical filter column in a substantially horizontal direction, said filter column being defined on the inlet side of the crude liquid by a wall comprising a series of overlapping plates inclined downwardly, to be referred to below as "shuters," and on the outlet side of the crude liquid defined by a wall consisting of a sieve, and—unlike conventional filter columns—no continuous or intermittent vertical movement of the column takes place, but the filter column is stationary during filtration. When the filter particles have been contaminated, the filtering operation is interrupted at convenient intervals and, in order to decontaminate the filter particles, a water stream is fed into the filter column. Under the influence of the upwardly streaming washing water, the particulate substance of the filter column is broken up or loosened, whereby the contaminated filter layer is shoved along the shutter wall through the gaps between the shutters in reverse sense to the filtering direction, into the crude water distributor space situated on the other side of the shutter wall, and the contaminated particles thus obtained are recycled in a known manner to the top part of the filter column, after the feeding of washing water has ceased, whereafter the filtering operation begins again.

In order to realize the filtering process according to invention, an apparatus is employed in which the filter column is defined on the crude liquid inlet side by a shutter wall, and on the outlet side of the filtered liquid by a sieve wall. Beyond the shutter wall a distributor space is formed for the liquid, into which the contaminated filter particles next to the shutter wall are taken up. In accordance with its double role, the liquid distributor space is connected with an inlet duct for the crude water and with a space whereto the particulate material of the contaminated layer is conveyed for purification and recycling. Under the crude water distributor space there is formed a sand collector space which is connected with the top part of the filter vessel or container by a conveyor device. Below the filter column there is provided a washing water distributor space into which the washing water required for the decontamination of the contaminated filter particles is introduced. Moreover, provision is made for collecting the filtered water and for a discharge duct system.

The apparatus according to the invention may be conveniently supplemented with further features or particulars. Thus for example, it has been found that since the apertures from the water distributor space into the filter column are disposed at the bottom of the vessel, large quantities of sand are prevented from entering the water distributor space, even if the size of the apertures amounts to a multiple of the size of the filter particles. The large dimension of the apertures, however, has the advantage that it is possible to employ crude water for the decontamination of the filter column. For this reason it has been found convenient to design the passage apertures of the washing water distributor space as described above.

It is possible to feed the washing water distributor container from a separate system, but it is convenient to feed it from the crude water inlet, since this can be achieved in accordance with the above.

One illustrative embodiment of the apparatus according to the invention is described below more particularly, with reference to the accompanying drawing.

The drawing represents a schematic section through the apparatus according to the invention.

In a vertically disposed container 1 there is arranged, parallel or substantially parallel to the side walls, a shuttered pipe 2 closed from above and open on the bottom. Within the shuttered pipe 2 a guiding tube 3 runs along the whole length of the shuttered pipe 2 with a certain spacing from the inner edge of the shutter plates. The top part of the guiding tube 3 is coupled with an inlet duct 4 for the crude liquid. The width of the cylindrical crude water distributor space between the shuttered pipe 2 and the guiding tube 3 may be determined empirically, subject to the size of the sand grains. For larger sand grains in general a greater width of the distributor space is required. The same takes up the contaminated filter particles for purification.

With a certain spacing from the inner wall surface of the container 1 a sieve cloth 5, for example of artificial material is provided, which acts as a filter sack in preventing the filter particles, e.g. sand particles contained in the space between the sieve cloth 5 and the shuttered pipe 2 to get into a space 6 between the wall of the container 1 and the filter cloth 5. The filtered pure water is discharged by the space 6 through a collector duct 7 and a discharge pipe stub 8.

Under the shutter pipe 2 there is provided a conical sand collector space 9 tapering towards its base, and a conical washing water distributor container 10 with a diameter increasing towards its base. In the sand collector vessel a mammoth tube or air lift 16, 17 of known design is arranged, running across the container or guiding tube 3, with its upper end protruding from the surface 11 of the liquid in the upper part of the container 1. The tube 12 running through the container 1 is connected to the distributor container 10 for the washing water, and is so connected to the inlet duct 4 on the top part of the container 1 as to form a branching thereof. At the juncture of the branching a shutoff switching valve 13 is provided, by means of which the crude water is alternatively allowed to pass through the inlet duct 4 into the guiding tube 3, or through the pipe 12 into the distributor vessel 10.

A number of apertures 14 is provided around the periphery of the bottom of the distributor vessel 10, through which the washing water can pass from vessel 10 into the filter column walls.

The operation of the apparatus is as follows:

Crude water flows through the inlet duct 4 continuously into the guiding tube 3, and is discharged at the bottom, thereafter it passes upwards in the distributor space between the shutter pipe 2 and the guiding tube 3, then it passes between the shutter plates in practically a horizontal direction through the filter column, during which passage the liquid is filtered by the secondary filter bed produced in the interstices between the filter particles, i.e. contaminations are separated. The decontaminated water passes from the filter column into the space 6, whence it is fed through the collector duct 7 and pipe stub 8 into the place of storage or use. During filtration and purification, no crude water passes in tube 12.

After several days' operation, a certain contamination of the filter layer composed of stationary particles mainly situated next to the shutter tube 2 may occur, considerably reducing the filtering power of said layer. In that case the pipe stub 8 as well as the inlet duct 4 are shut by means of the shutoff valve or cock 13 and the pipe 12 is opened, in other words, crude water is fed into the distributor vessel 10 instead of the guiding tube 3. The washing water then passes through apertures 14 into the filter column, taking along the filter particles from the bottom of the distributor vessel 10, and while it passes through the filter column, the washing water causes that layer of the filter column situated next to the shutter tube 2 to pass between the gaps between the shutters into the crude water distributor space. Accordingly, during recycling always the most contaminated portion of the filter column which has a tendency to incrustation, is thoroughly purified during a reverse flow direction. The contaminated, slurry-containing water is discharged through the pipe stub 15 arranged in the upper part of the vessel and adjusting the height of the level 11 of the liquid in the container.

The ingress of crude water into the liquid distributor container 10 is interrupted after washing has been completed, by means of switching the valve 13, the mammoth tube (air left) which may be of any conventional construction is actuated by the blowing air through the tube 16, whereupon the sand which got into the liquid distributor space between guiding duct 3 and shutter pipe 2 during washing, as well as the sand settled in the sand collector space 9 are discharged through the pipe 17 disposed in the upper part of the filter column. Considering the tube 16 and the pipe 17 to be completely filled with water, air under pressure is introduced into tube 16 until the air-water interface is just at the bottom of pipe 17, after which further air introduced into tube 16 can escape only upwardly through pipe 17. This displaces water from the top of pipe 17 and reduces the weight of the water in pipe 17. The deficiency of water in pipe 17 can only be made up from the water in the lower end of tube 16, whereupon an upward flow of water in the lower end of tube 16 is induced; and it is this upward flow which entrains the solid materials adjacent the lower end of tube 16 for upward flow through pipe 17. After the discharge of sand, the filtering process is again set going by opening the discharge pipe 8.

It is possible to insert, after the shutoff valve 13, into the pipe of the crude water an adjustable shutoff means provided with a float and capable of recording the amount of liquid purified by the column in the unit of time, whereby a constant water level is secured through appropriate throttling of the inlet duct of the crude water.

The apparatus according to the invention has the following main advantages:

Numerous deficiencies of static or stationary filters are eliminated:

a. The filter column need not be very thick, b. a small quantity of filter particles can be decontaminated with a small quantity of water, c. expensive machinery as well as voluminous installations are dispensed with, d. the uniformity of particle size is no longer an essential requirement, since during reversed flow for washing the fine sand layer situated on the top part owing to segregation does not participate in filtration, so that the slurry intake power is increased 10 to 15-fold.

e. The major problem of static filters, i.e. thick crusts, is automatically solved, since a uniform secondary filter bed is continuously formed along the whole filtering surface, and the surface layer so contaminated can be fully and entirely removed by a single water jet.

f. Washing can be performed with crude water instead of pure water, partly because the washing water is not fed through the pipe system serving for the discharge of the decontaminated water, partly because large-size inlet apertures are provided on the distributor container for the washing water.

The apparatus according to the invention has important advantages when compared with conventional moving bed filters, such as:

a. When a cylindrical container is used, the liquid flows radially in an outward direction, so that its velocity continuously decreases. Accordingly, using a minimum quantity of chemicals sometimes even without any chemicals filtered water of excellent quality can be obtained, since a homogenous secondary filter bed is formed from the artificial or natural particles suspended in the interstices of the static filter column composed of compactly arranged particles, whereby a completely pure liquid is obtained, i.e. crystal filtration is carried out.

b. The thickness of the sand layer can be still further reduced, since the floating particles become more easily stuck.

c. Since the most badly contaminated surface layer is completely removed during decontamination, the filter bed fully recovers its filtering capacity with each decontaminating step.

d. As only a fraction of the particles is caused to circulate, the associated loss of energy and water is substantially reduced.

e. Since high quality filtration can be achieved by means of small-size floccules, the quantity of chemicals required is also cut down.

The scope of the invention is not restricted to the above described illustrative embodiment. It is accordingly possible to alter the design of the means securing the constancy of the liquid level; the container may be cylindrical or prismatic; the sand collector space and the space for collecting washing water may be of different design, pure water can be discharged by means of collector pipes (an aggregate of pipes), sand can be removed from the collector space by means of a water jet pump instead of the proposed mammoth tube, and a flap valve can be employed instead of the described shutoff valve.

What we claim is:

1. A process for the filtration of liquids, comprising supplying liquid to a vertical column of filter material through a foraminous wall that laterally bounds one side of the column, said wall being comprised by a plurality of shutters in the form of spaced overlapping plates inclined downwardly toward the filter material, removing filtrate through another foraminous wall on the opposite side of the column, said another wall being impermeable to the filter material, cleaning the filter by interrupting the flow of the first-mentioned liquid and forcing wash liquid from the lower end of said column of filter material upwardly between said walls through the column of filter material thereby to shift a contaminated layer of filter material next to the first-mentioned wall out through the first-mentioned wall and into a liquid distributor chamber beyond the first-mentioned wall so that the material of said shifted layer settles at the bottom of said distributor chamber, and airlifting to the top of said filter column the material that collects at the bottom of said distributor chamber.

2. Apparatus for filtering liquids, comprising an upright column of filter particles, inner and outer foraminous walls bounding said column of filter material on opposite sides, wherein the improvement consists in the provision of a guiding pipe closed at its top and open at its bottom inside of said inner foraminous wall and coaxial therewith, said inner wall being comprised by a plurality of shutters in the form of spaced overlapping plates inclined downwardly outwardly and said outer wall being impermeable to the filter material, the guiding pipe and said inner foraminous wall forming a liquid distributor chamber of annular cross-sectional area, this liquid distributor chamber being connected with an inlet duct for crude water, a downwardly tapering distributor vessel for wash water under the filter column, a tube connected to said wash water distributor vessel for conducting wash water thereinto, said vessel having passages for introducing wash water into said filter column, a conical sand collector chamber disposed beneath the guiding pipe and liquid distributor chamber, and an air lift extending from adjacent the bottom of said sand collector chamber to the top of the apparatus.